April 11, 1967 — A. M. LOHMANN — 3,313,236
MULTIPLE FUNCTION FUZES

Filed May 12, 1965 — 2 Sheets-Sheet 1

A = SEQUENTIAL DELAY PRIMER
B = IMPACT DETONATOR
C = PYROTECHNIC RELAY
D = BOOSTER CHARGE
E = FIRST FIRING PIN
F = SECOND FIRING PIN

*INVENTOR.*
ARTHUR M. LOHMANN
BY Paul A. Welter
ATTORNEY

April 11, 1967 A. M. LOHMANN 3,313,236
MULTIPLE FUNCTION FUZES

Filed May 12, 1965 2 Sheets-Sheet 2

INVENTOR.
ARTHUR M. LOHMANN
BY Paul A. Welter
ATTORNEY

United States Patent Office 3,313,236
Patented Apr. 11, 1967

3,313,236
MULTIPLE FUNCTION FUZES
Arthur M. Lohmann, Hopkins, Minn., assignor to Honeywell Inc., a corporation of Delaware
Filed May 12, 1965, Ser. No. 455,201
9 Claims. (Cl. 102—72)

This invention relates generally to the art of munition fuzing and more specifically relates to a multiple function fuze in which: The fuze becomes inoperative if impact occurs during a first timed period after launch; instantaneous detonation occurs if impact occurs during a subsequent second timed period after launch; and automatic detonation occurs if impact does not occur prior to the termination of the second timed period.

In modern-day combat operations, it is common practice for tactical aircraft flying support missions to operate at very low altitudes. Low altitude operations are required because of the increasing danger from highly accurate anti-aircraft weapons. At relatively high altitudes, the attacking aircraft affords a much better target for defensive weapons, especially those weapons that are radar controlled or that contain target seeking devices. At relatively low altitudes, the attacking aircraft is over the target for a very short period of time, making it difficult for defensive weapon operators to acquire and track the aircraft.

Because of the low altitude at which a weapon such as a bomb is dropped, there is a possibility that the bomb explosion will cause damage to the aircraft itself. The bomb after release from the aircraft tends to travel along with the aircraft at the same speed until it impacts with the ground. At extremely low altitudes, it is possible that the bomb might burst directly beneath the aircraft that released the bomb. At a slightly higher altitude, however, the time required for the bomb to fall will be sufficient for the aircraft to escape the area in which self-inflicted damage can occur. For any given weapon, therefore, there will be a safe minimum altitude below which damage to the aircraft can occur.

The fuze being used in such a bomb must be designed such that it will not detonate the bomb if the bomb is dropped from below the safe minimum altitude. The time required for the bomb to drop from this safe minimum altitude can be calculated. The fuze must then be designed such that it cannot detonate the bomb until this time has elapsed. The present invention provides a fuze that will not detonate upon impact if impact occurs prior to the end of a first timed period. This feature also prevents detonation of the bomb if it is accidentally dropped while the aircraft is still on the ground.

In some situations a weapon is more effective if it is detonated upon impact. For example, a shaped charge device is effective against a target such as a tank only if detonation occurs at the proper standoff distance from the target. In this type of situation, impact with the target can be utilized to provide the signal necessary to detonate the weapon.

In other situations, it is more advantageous that the weapon explode before reaching the target. Anti-personnel weapons, for example, are much more effective if they are exploded a certain distance above the ground. The fragments from such an explosion will cover a much wider area than would be the case in which the weapon is exploded upon impact.

In a tactical situation, it is usually not possible to know in advance what type of target may present itself. Targets of opportunity such as tanks, trucks, and buildings may be found. In such cases, it would be desirable to have the bomb explode upon impact with the target. In other cases the target of opportunity might be a group of enemy troops, in which case detonation of the weapon at a distance above the ground would be more effective. In order that the pilot can utilize his bomb load to the best advantage, means must be provided to enable him to select either impact detonation or air-burst of the bombs.

In many prior art fuzes, the selection of operating mode is made at the time the bomb is loaded into the aircraft. After the aircraft is airborne, the pilot no longer has any control over the mode of operation. If, for example, the fuze is preset for impact detonation, the bomb will not be fully effective if used against ground troops.

Other munition fuzing devices have utilized an umbilical connection between the aircraft and the bomb to enable the pilot to set the correct mode of operation while the aircraft is airborne. Such connections, however, greatly increase the complexity of the bomb fuze, increase the time required to load the bomb into the aircraft, require a complex control system in the aircraft itself, and in some cases reduce the safety of the bomb.

The present invention is a self-contained munition fuze incorporating the desirable features previously discussed. When the fuze is in the safe condition, it can be handled or dropped without danger of detonation. After the bomb is launched (first event), this fuze provides a first timed period during which impact (second event) will not cause detonation of the bomb. If impact occurs during this first timed period, the fuze will become a dud and will remain so. This first timed period represents the time that is required for the bomb to drop from the safe minimum altitude.

After the first timed period is complete, a second timed period is provided during which impact of the bomb will cause immediate detonation. Since the second timed period represents a second distance through which the bomb can fall, immediate detonation will occur upon impact if the bomb is dropped from an altitude above the safe minimum altitude but below a second known altitude.

At the end of the second timed period, means are provided to automatically detonate the bomb if impact has not occurred. If the bomb is dropped from an altitude above the above mentioned second altitude, the bomb will thus explode prior to reaching the ground. The two timed periods are selected so that the safe minimum altitude is known and so that the second altitude is known.

If the pilot wishes to effect a ground burst, it is only necessary that he fly at an altitude between the safe minimum altitude and the second known altitude. If the pilot desires to effect an air burst, it is necessary that he fly at an altitude above the second known altitude. It is thus a relatively simple matter for the pilot to select the most desirable operating mode. At the same time, errors in judgment or sudden changes in altitude not within the control of the pilot will not result in an explosion that is dangerous to the aircraft.

Mechanization of the above described concept is quite simple according to the present invention. A pair of concentrically mounted rotors are used as carrier members for the various explosive elements. The rotors provide a safe distance between the explosive elements during handling for safety purposes. The timing action is provided by a pyrotechnick delay charge. No intricate electrical or mechanical timing devices are required in this fuze.

It is therefore a primary purpose of the present invention to provide an automatically operated multiple function munition fuze.

Another object of the present invention is to provide a fuze that will not detonate if impact occurs during a first timed period after launch; that will detonate upon impact if impact occurs within a subsequent second timed period; and that will detonate automatically prior to impact if impact does not occur prior to the end of the second timed period.

A further object of the present invention is to provide a fuze that will allow a pilot to select either impact detonation or air burst of a bomb by selecting the altitude from which the bomb is dropped.

Other objects of the present invention will become apparent from the specification and claims when considered in connection with the accompanying drawings, in which:

Figure 9:
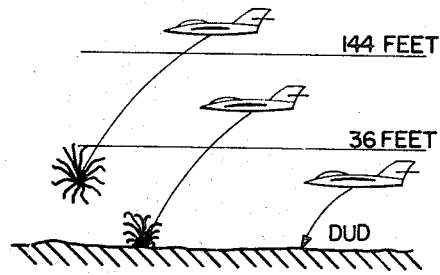
Figure 6:
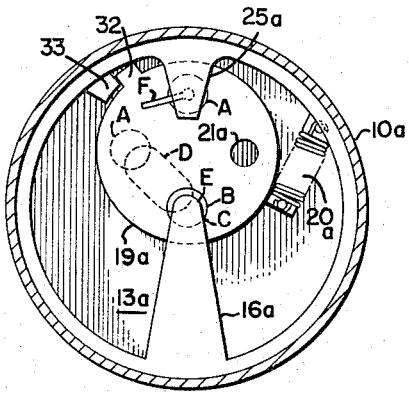
FIGURE 6 is a top plan view of the fuze in the armed condition.

FIGURE 9 discloses the operation of the fuze when the bomb is dropped from three critical altitudes.

Figure 1:
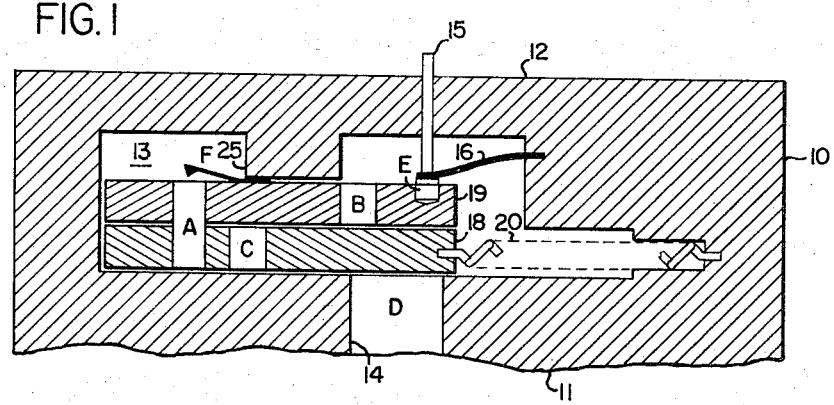
FIGURE 1 is a sectional side view of a schematic representation of the fuze with the carrier members in the safe position.
Figure 2:
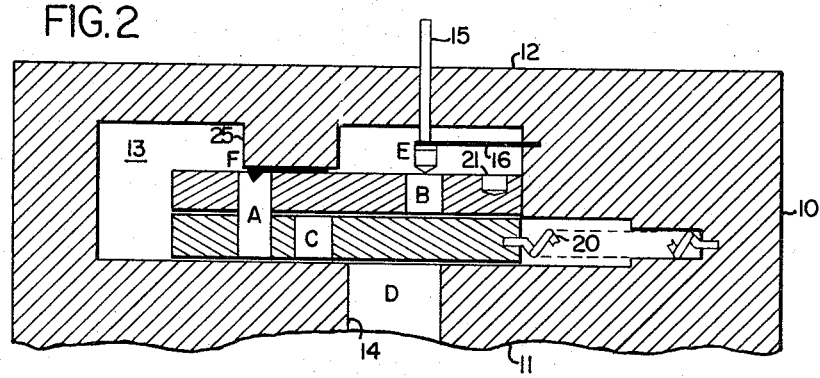
FIGURE 2 is a sectional side view of the schematic representation of the fuze with the carrier members in the intermediate position.
Figure 3:
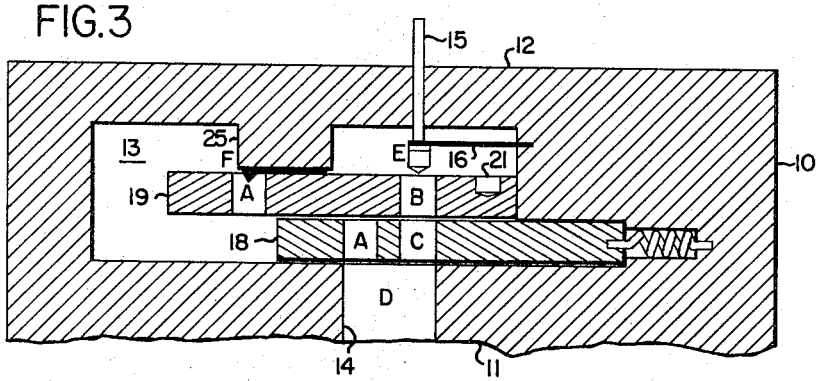
FIGURE 3 is a similar sectional view of the fuze in the armed condition.

Referring now to the drawings, there is disclosed in FIGURES 1–3 a schematic representation of the subject munition fuze. The preferred embodiment of the present invention is disclosed in FIGURES 4–7 but the operational sequence can more easily be seen in FIGURES 1–3. In the preferred embodiment, the carrier members for the explosive elements are a pair of concentrically mounted cylindrical rotors. In the schematic representation, the carrier members are rectangular elements mounted for linear motion within the fuze housing.

Referring now to FIGURE 1, there is disclosed the munition fuze in the safe condition or position. The fuze includes a housing 10 having a first closed end portion 11 and a second closed end portion 12. A chamber 13 is located within housing 10. Extending through first end 11 into chamber 13 is an opening 14 in which is mounted an explosive lead cup or booster charge D. Mounted for axial movement in second end 12 is an impact sensing device 15. Mounted within chamber 13 is a flexible firing pin spring 16. Firing pin spring 16 has a first end mounted firmly in housing 10 and a second end connected to impact sensing device 15. Axial motion of device 15 thus causes spring 16 to flex. Attached to the second end of spring 16 is a firing pin E that is in line with booster charge D. With no external forces applied, spring 16 will take the position shown in FIGURE 2.

Mounted within chamber 13 for limited linear movement are a first carrier member or slider 18 and a second carrier member or slider 19. A coiled spring 20 is connected between carrier member 18 and housing 10. Coiled spring 20 provides the driving force necessary to move carrier members 18 and 19.

Carrier members 18 and 19 are held in the safe position shown in FIGURE 1 by firing pin E which extends into a cup 21 in second carrier member 19. External means (not shown) are provided to hold impact sensing device 15 downwardly against the spring force of spring 16 to hold firing pin E in cup 21.

Extending through second carrier member 19 is an impact detonator B that is out of line with firing pin E in the safe position. Extending through carrier member 18 is an explosive relay charge C that is out of line with detonator B and firing pin E in the safe position. Extending through both rotors is a pyrotechnic sequential delay primer A. In the safe position shown in FIGURE 1, spring 20 tends to drive carrier member 18 to the right. Primer A, however, prevents such movement since it locks the two carrier members together.

Mounted on second carrier member 19 is a second firing pin F that lies in line with primer A. In the safe position of the fuze shown in FIGURE 1, firing pin F is not in contact with primer A. Any movement of second carrier member 19 to the right, however, will cause firing pin F to be forced into primer A as it slides beneath a cam surface 25.

OPERATION

The operation of the present invention can be easily seen from FIGURES 1–3. Although these figures do not represent the preferred embodiment of the present invention, there is no reason why carrier members having linear motion cannot be used in an operative fuze rather than carrier members having rotational motion.

In FIGURE 1 the fuze is shown in the safe position. In the safe position, spring 20 is stretched so that it exerts a force on first carrier member 18 that tends to drive carrier member 18 to the right. Carrier member 18 cannot move, however, since it is locked to carrier member 19 by primer A. Carrier member 19 is in turn locked in position by firing pin E that extends into cup 21. Firing pin E is held in cup 21 by impact sensing device 15. Impact sensing device 15 can be held in the position shown in FIGURE 1 by a variety of well-known mechanical devices. A lanyard could be utilized as could a bore-riding safety pin. If a lanyard is used, it would be pulled free when the bomb is ejected from the aircraft. A bore riding safety pin is a spring loaded pin that rides the inner surface of the gun tube until the bomb is ejected. The pin is then automatically ejected to release device 15. The principle of a bore-riding safety pin is explained in the Woodberry Patent 2,118,062, that issued May 24, 1938.

When the munition is launched, device 15 is released so that spring 16 drives firing pin E to the position shown in FIGURE 2. The two carrier members are immediately driven to an intermediate position shown in FIGURE 2 by spring 20. As carrier member 19 is driven from the safe to the intermediate position, firing pin F is driven by cam 25 into primer A. Primer A is thus ignited immediately. At the same time, detonator B has moved to a position in line with firing pin E. It is noted that carrier member 19 remains permanently positioned in the intermediate position since it now abuts housing 10.

If impact should occur with the carrier members in the intermediate position, device 15 will drive firing pin E into detonator B, which will explode. Since detonator B is separated from lead cup D by carrier member 18, however, the bomb will not explode. The explosive force from detonator B will simply deform the two rotors to dud the fuze completely.

Pyrotechnic sequential delay primer A is constructed as follows. A quantity of pyrotechnic delay material is located at each end of primer A. The two delay portions are separated by a shearing charge adjacent the intersection of the two carrier members. When primer A is ignited, the top delay charge slowly burns through until it ignites the shearing charge. When the shearing charge is ignited, the casing of primer A is ruptured to release carrier member 18. At the same time, the second portion of the delay charge in carrier member 18 is ignited. In the preferred embodiment of the invention, the delay charge in each rotor requires 1.5 seconds to burn completely through.

When the carrier members move from the safe to the intermediate position, firing pin F ignites primer A. After 1.5 seconds, primer A is ruptured at the junction of the two carrier members to release carrier member 18. Carrier member 18 then moves to the armed position shown in FIGURE 3. In the armed position, both primer A and relay charge C are in line with booster charge D. Relay charge is also in line with detonator B and firing pin E. If no impact occurs within 1.5 seconds after the two carrier members are split, primer A will ignite booster charge D to explode the bomb. If, however, impact does occur within the 1.5 second period, impact sensing device 15 will drive firing pin E into detonator B to ignite booster charge D through relay charge C.

The operation of the fuze can be summarized as follows. In the safe position shown in FIGURE 1, the fuze cannot be detonated since none of the explosive charges are in line with booster charge D. When the munition is launched, the carrier members immediately move to the intermediate position shown in FIGURE 2 to ignite primer A and place detonator B in line with firing pin E. If impact occurs within 1.5 seconds, detonator B will be ignited to dud the fuze. If impact does not occur within 1.5 seconds, primer A will shear to release carrier member 18. Carrier member 18 then moves to the armed position shown in FIGURE 3. If impact occurs within the next 1.5 seconds, booster charge D will be ignited through the action of firing pin E. If no impact occurs within the second 1.5 second period, primer A will ignite booster charge D.

The first 1.5 second delay period provided by primer A represents 36 feet of free fall for a bomb. This particular fuze would thus be used with a bomb for which the safe minimum altitude is 36 feet. If the bomb were dropped from an altitude of less than 36 feet, the fuze at impact would be in the position shown in FIGURE 2. Impact of the bomb would thus dud the fuze as shown in FIGURE 9. The second 1.5 second timed period represents a total time of fall of 3 seconds corresponding to a total distance of fall of 144 feet. During this second timed period, the fuze will be in the armed position shown in FIGURE 3. Thus, if the plane is flying between an altitude of 36 feet and 144 feet, the bomb will detonate upon impact as shown in FIGURE 9. If the bomb is dropped from an altitude of more than 144 feet, more than 3 seconds will be required for the bomb to reach the ground. The bomb will thus automatically detonate 144 feet below the aircraft as shown in FIGURE 9.

PREFERRED EMBODIMENT

The preferred embodiment of the present invention is disclosed in FIGURES 4-7. The same reference numerals, distinguished by the addition of the letter *a*, will be used to identify the corresponding elements of the preferred embodiment.

Figure 4:
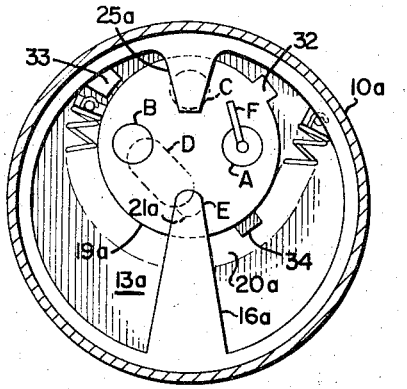
FIGURE 4 is a top plan view of the fuze in the safe condition, taking along line 4—4 of FIGURE 7.
Figure 7:
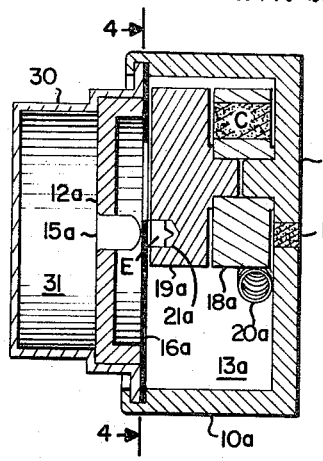
FIGURE 7 is a sectional side view of the fuze in the safe condition.

In FIGURE 4, the fuze is shown in the safe position. Both carrier members are now cylindrical rotors concentrically mounted for rotation about a common axis as shown in FIGURE 7. Second rotor 19a is visible in FIGURE 4 but first rotor 18a is hidden beneath rotor 19a. Coiled spring 20a is connected between housing 10a and first rotor 18a, tending to cause counterclockwise rotation of the rotors. The two rotors are connected together by primer A. Detonator B is out of line with firing pin E and is separated from booster charge D by rotor 18a. Relay charge C in rotor 18a is out of line with both detonator B and booster charge D. Again, the two rotors are being held in the safe position by firing pin E located in cup 21a.

In FIGURE 7 there is disclosed a sectional side view of the fuze in the safe position. Impact sensing device 15a holding firing pin E in cup 21a.

In FIGURE 7, a fuze cap 30 defines a chamber 31 adjacent impact sensing device 15a. A standard impact sensing device would be mounted within chamber 31 and connected to device 15a. Since a variety of such devices are available to the munition designer, it is not considered necessary to describe such a device in detail in the specification. It is sufficient to note that device 15a would be controlled by further sensing means.

Upon launch of the munition, device 15a would be released to in turn release firing pin E. Firing pin E would move out of cup 21a under the influence of spring 16a. The two rotors would then be driven by spring 20a to the intermediate position shown in FIGURE 5. To prevent rotation of the rotors from the intermediate position shown in FIGURE 5, a first stop pin 32 is mounted on rotor 19a to engage an abutment member 33 mounted on housing 10a.

Figure 5:
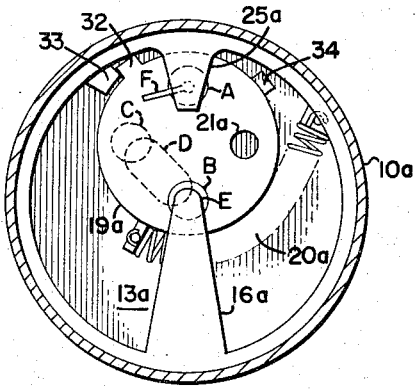
FIGURE 5 is a top plan view of the fuze in the intermediate condition.

In the intermediate position shown in FIGURE 5, firing pin F, which is attached to rotor 19a, has been driven into primer A by cam member 25a to ignite primer A. Detonator B is now in line with firing pin E but relay charge C is still out of line with detonator B. Since detonator B is separated from booster charge D by rotor 18a, impact of the munition will serve to dud the fuze.

After the rotors remain in the intermediate position shown in FIGURE 5 for 1.5 seconds, primer A will shear at the junction of the two rotors to free rotor 18a. Coiled spring 20a will then drive rotor 18a in a further counterclockwise direction to the armed position shown in FIGURE 6. A second stop pin 34 mounted on rotor 18a will also engage abutment member 33 at that time to hold the rotors in the armed position. In the armed position, the bottom half of primer A is now in line with booster charge D. If no impact occurs within the next 1.5 seconds, primer A will ignite booster charge or lead cup D. Also in line with booster charge D are relay charge C, detonator B, and firing pin E. If impact does occur within 1.5 seconds, firing pin E will initiate detonator B to in turn explode booster charge D.

From the above description, it can be seen that the preferred embodiment disclosed in FIGURES 4-7 operates in exactly the same fashion as the schematic representation of the invention disclosed in FIGURES 1-3. As shown in FIGURE 9, the pilot can select the mode of operation by selecting the proper altitude from which the bomb is launched. It should also be apparent that different time delays could be incorporated into the fuze, thus changing the critical altitudes disclosed in FIGURE 9.

Figure 8:
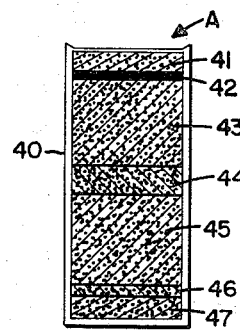
FIGURE 8 is a sectional side view of the sequential delay primer.

Referring now to FIGURE 8 there is disclosed a sectional side view of pyrotechnic sequential delay primer A. Primer A has a thin walled cylindrical metal casing 40. Casing 40 is of sufficient length to extend through the two rotors and has sufficient strength to hold the two rotors together against the force of spring 20a. Contained within sealed casing 40 are a plurality of pyrotechnic charges. At the top of casing 40 adjacent firing pin F is a sensitive igniter charge 41. Igniter charge 41 could be a commercially available substance known as NOL-130. When struck by firing pin F, igniter 41 will ignite immediately to provide both a high temperature and a high pressure. Mounted below igniter 41 is a thin metal plate 42. Mounted below metal plate 42 is a delay charge 43. Mounted in the central portion of casing 40 is a shear charge 44. Shear charge 44 is thus located at the junction of the two rotors. On the opposite side of shear charge 44 is a second delay charge 45, located adjacent delay charge 45 is an intermediate charge 46 and located adjacent intermediate charge 46 is an explosive output charge 47.

The two delay mixtures 43 and 45 could be composed of a tungsten of molybdenum delay mixture. Shear charge 44 could be either zirconium barium nitrate, or boron potassium nitrate. Intermediate charge 46 could be lead azide, and explosive charge 47 could be RDX.

When firing pin F strikes igniter 41, the following sequence of events occurs. Igniter 41 ignites to exert a high pressure against plate 42 as well as to increase the temperature of plate 42. Plate 42 distributes the temperature and pressure effects evenly over the surface of delay mixture 43. Delay mixture 43 thus ignites and begins to burn at a relatively slow rate toward the shear charge 44. In the preferred embodiment, the delay charge 43 would burn for 1.5 seconds. At the end of this period, shear charge 44 would be ignited. The particular material selected for shear charge 44 must both shear casing 40 and ignite delay charge 45. Either of the above mentioned materials would suffice for this purpose. Delay charge 45 would then burn for an additional 1.5 seconds. Since RDX is a rather stable explosive, an intermediate charge 46 of lead azide is placed between delay charge 45 and explosive charge 47. Lead azide will ignite much more readily than will RDX but RDX is necessary to provide the explosive output necessary to detonate booster charge D.

The exact configuration of primer A described above is not critical to this invention. Although the above paragraphs describe a particular configuration that will give the desired results, it is possible that other configurations will occur to those skilled in the art. As long as the primer provides the holding function, the delay functions and the shearing function, the particular interior configuration is not critical.

Many variations in the design of this invention may occur to those skilled in the art. As previously mentioned, the preferred embodiment discloses a pair of cylindrical rotors that are mounted for rotation about a common axis. As disclosed in the schematic representation shown in FIGURES 1–3, however, it is also possible that carrier members having linear motion may be effectively employed. It should also be possible to employ a different firing means and a different driving means. Since it is possible to mechanize the invention in a number of different ways, it will be understood that the scope of the invention will be limited only by the scope of the appended claims. I claim as my invention:

1. A munition fuze, comprising:
   (a) a housing having a chamber therein with first and second opposite ends;
   (b) a first rotor mounted in said chamber adjacent said first end for rotation from a safe position through an intermediate position to an armed position about a concentric axis perpendicular to said ends;
   (c) a second rotor mounted in said chamber concentrically with said first rotor for rotation between corresponding safe and intermediate positions;
   (d) an explosive charge mounted in said first end adjacent said first rotor;
   (e) a flat spring member having one end mounted to said housing in said chamber and the other end lying adjacent said second rotor, said spring member being biased away from said second rotor;
   (f) said other end having a firing pin mounted thereon in line with said explosive charge;
   (g) said second rotor having a cup formed therein adjacent said firing pin with said second rotor in said safe position;
   (h) impact sensing means mounted in said second end of said housing to hold said firing pin in said cup to thereby hold said second rotor in said safe position, said sensing means being adapted to release said firing pin from said cup upon launch and to drive said firing pin into said second rotor upon impact;
   (i) driving means mounted in said housing to rotate said first rotor from said safe to said armed position;
   (j) said first rotor having an opening therein out of line with said explosive charge in said safe and intermediate positions and in line with said explosive charge in said armed position;
   (k) said second rotor having an opening therein in line with said opening in said first rotor in said safe position;
   (l) a sequential pyrotechnic delay primer mounted in said openings in said rotors to lock said rotors together for simultaneous rotation between said safe and said intermediate position;
   (m) a second firing pin resiliently mounted on said second rotor adjacent said primer;
   (n) a cam member mounted on said housing adjacent said second firing pin to drive said second firing pin into said primer to ignite said primer when said rotors move from said safe to said intermediate position;
   (o) said primer having a shearing charge therein adjacent the intersection of said two rotors to shear the primer casing after a timed delay after ignition to release said first rotor which is then rotated to said armed position by said driving means leaving said second rotor in said intermediate position;
   (p) an impact detonator mounted in said second rotor out of line with said firing pin in said safe position and in line with said firing pin in said intermediate position, an impact occurring with both of said rotors in said intermediate position causing said sensing means to drive said firing pin into said impact detonator to thereby deform said rotors to dud said fuze; and
   (q) said first rotor having a relay charge mounted therein out of line with said explosive charge in said safe and intermediate positions and in line with said firing pin, said impact detonator, and said explosive charge in said armed position, said ignited primer in said first rotor also being in line with said explosive charge in said armed position, said ignited primer thereby igniting said explosive charge if impact does not occur within a timed period after said first rotor reaches said armed position, said firing pin igniting said explosive charge through said impact detonator and said relay charge if impact occurs during said timed period.

2. A munition fuze, comprising:
   (a) a housing having a chamber therein;
   (b) a first carrier member mounted in said chamber for movement from a safe position through an intermediate position to an armed position;
   (c) a second carrier member mounted in said chamber adjacent said first carrier member for movement between corresponding safe and intermediate positions;
   (d) an explosive charge mounted in said housing adjacent said first carrier member;
   (e) a flat spring member having one end mounted to said housing in said chamber and the other end lying adjacent said second carrier member, said spring member being biased away from said second carrier member;
   (f) said other end having a firing pin mounted thereon in line with said explosive charge;
   (g) said second carrier member in said safe position having a cup formed therein adjacent said firing pin;
   (h) impact sensing means mounted in said housing to hold said firing pin in said cup to thereby hold said second carried member in said safe position, said sensing means being adapted to release said firing pin from said cup upon launch and to drive said firing pin into said second carrier member upon impact;
   (i) driving means mounted in said housing to move said first carrier member from said safe to said armed position;
   (j) said first carrier member having an opening threin out of line with said explosive charge in said safe and intermediate positions and in line with said explosive charge in said armed position;
   (k) said second carrier member having an opening therein in line with said opening in said first carrier member in said safe position;
   (l) a sequential delay primer mounted in said openings in said carrier members to lock said carrier members together for simultaneous movement between said safe and said intermediate position;

(m) a second firing pin resiliently mounted on said second carrier member adjacent said primer;

(n) a cam member mounted on said housing adjacent said second firing pin to drive said second firing pin into said primer to ignite said primer when said carrier members move from said safe to said intermediate position;

(o) said primer having a shearing charge therein adjacent the intersection of said two carrier members to shear the primer casing after a timed delay after ignition to release said first carrier member which is then moved to said armed position by said driving means leaving said second carrier member in said intermediate position;

(p) an impact detonator mounted in said second carrier member out of line with said firing pin in said safe position and in line with said firing pin in said intermediate position, an impact occurring with both of said carrier members in said intermediate position causing said sensing means to drive said firing pin into said impact detonator to thereby deform said carrier members to dud said fuze; and (q) said first carrier member having a relay charge mounted therein out of line with said explosive charge in said safe and intermediate positions and in line with said firing pin, said impact detonator, and said explosive charge in said armed position, said ignited primer in said first carrier member also being in line with said explosive charge in said armed position, said ignited primer thereby igniting said explosive charge if impact does not occur within a timed period after said first carrier member reaches said armed position, said firing pin igniting said explosive charge through said impact detonator and said relay charge if impact occurs during said timed period.

3. A munition fuze, comprising:
(a) a housing member having a chamber therein;
(b) a first carrier member mounted in said chamber for movement from a safe position through an intermediate position to an armed position;
(c) a second carrier member mounted in said chamber adjacent said first carrier member for movement between corresponding safe and intermediate positions;
(d) a flat spring member mounted in said chamber adjacent said second carrier member and being biased away from said second carrier member, said spring member having a firing pin mounted thereon;
(e) said second carrier member in said safe position having a cup formed therein in line with said firing pin;
(f) impact sensing means mounted in said housing to hold said firing pin in said cup to thereby hold said second carrier member in said safe position, said sensing means being adapted to release said firing pin from said cup upon launch and to drive said firing pin into said second carrier member upon impact;
(g) driving means mounted in said housing to move said first carrier member from said safe to said armed position;
(h) a sequential delay primer mounted in aligned openings in said first and second carrier members to lock said carrier members together for simultaneous movement between said safe and said intermediate position;
(i) means for igniting said primer upon movement of said carrier members from said safe to said intermediate position;
(j) said primer having a shearing charge therein adjacent the intersection of said two carrier members to shear the primer casing after a timed delay after ignition to release said first carrier member which is then moved to said armed position by said driving means leaving said second carrier member in said intermediate position;

(k) an impact detonator mounted in said second carrier member in line with said firing pin in said intermediate position, an impact occurring with both of said carrier members in said intermediate position causing said sensing means to drive said firing pin into said impact detonator to thereby deform said carrier members to dud said fuze; and (l) said first carrier member having a relay charge mounted therein in line with said firing pin and said impact detonator in said armed position, said ignited primer thereby exploding said munition if impact does not occur within a timed period after said first carrier member reaches said armed position, said firing pin exploding said munition through said impact detonator and said relay charge if impact occurs during said timed period.

4. A munition fuze, comprising:
(a) a housing having a chamber therein;
(b) a first rotor mounted in said chamber for rotation from a safe position through an intermediate position to an armed position about a concentric axis;
(c) a second rotor mounted in said chamber concentrically with said first rotor for rotation between corresponding safe and intermediate positions;
(d) said second rotor having a cup formed therein;
(e) a firing pin resiliently mounted in said chamber in line with said cup with said second rotor in said safe position;
(f) impact sensing means mounted in said housing to hold said firing pin in said cup to thereby hold said second rotor in said safe position, said sensing means being adapted to release said firing pin from said cup upon launch and to drive said firing pin into said second rotor upon impact;
(g) driving means mounted in said housing to rotate said first rotor from said safe to said armed position;
(h) a sequential delay primer mounted in aligned openings in said rotors to lock said rotors together for simultaneous rotation between said safe and said intermediate position;
(i) means for igniting said primer upon movement of said rotors from said safe to said intermediate position;
(j) said primer having a shearing charge therein adjacent the intersection of said two rotors to shear the primer casing after a timed delay after ignition to release said first rotor which is then rotated to said armed position by said driving means leaving said second rotor in said intermediate position;
(k) an impact detonator mounted in said second rotor in line with said firing pin in said intermediate position, an impact occurring with both of said rotors in said intermediate position causing said sensing means to drive said firing pin into said impact detonator to thereby deform said rotors to dud said fuze; and
(l) said first rotor having a relay charge mounted therein in line with said firing pin and said impact detonator in said armed position, said ignited delay primer thereby exploding said munition if impact does not occur within a timed period after said first rotor reaches said armed position, said firing pin exploding said munition through said impact detonator and said relay charge if impact occurs during said timed period.

5. A munition fuze, comprising:
(a) a housing having a chamber therein;
(b) a first rotor mounted in said chamber for rotation from a safe position through an intermediate position to an armed position about an axis;
(c) a second rotor mounted in said chamber for rotation between corresponding safe and intermediate positions about said axis;

(d) means for holding said rotors in said safe position and for releasing said rotors upon launch of said munition;
(e) driving means mounted in said housing to rotate said first rotor from said safe to said armed position;
(f) a sequential delay primer mounted in aligned openings in said rotors to lock said rotors together for simultaneous rotation between said safe and said intermediate position;
(g) means for igniting said primer upon movement of said rotors from said safe to said intermediate position;
(h) said primer having a shearing charge therein adjacent the intersection of said two rotors to shear the primer casing after a timed delay after ignition to release said first rotor which is then rotated to said armed position by said driving means leaving said second rotor in said intermediate position;
(i) firing pin means mounted in said chamber;
(j) an impact detonator mounted in said second rotor in line with said firing pin means in said intermediate position;
(k) means for driving said firing pin means into said impact detonator upon impact of said munition, an impact occurring with both of said rotors in said intermediate position driving said firing pin means into said impact detonator to thereby deform said rotors to dud said fuze; and
(l) said first rotor having a relay charge mounted therein in line with said firing pin means and said impact detonator in said armed position, said ignited primer in said first rotor thereby exploding said munition if impact does not occur within a timed period after said first rotor reaches said armed position, said firing pin means exploding said munition through said impact detonator and said relay charge if impact occurs during said timed period.

6. A munition fuze, comprising:
(a) a housing member having a chamber therein;
(b) a first carrier member mounted in said chamber for movement from a safe position through an intermediate position to an armed position;
(c) a second carrier member mounted in said chamber adjacent said first carrier member for movement between corresponding safe and intermediate positions;
(d) means for holding said second carrier member in said position and for releasing said second carrier member upon the occurrence of a first event;
(e) driving means mounted in said housing to move said first carrier member from said safe to said armed position;
(f) a pyrotechnic delay primer mounted in aligned openings in said first and second carrier members to lock said carrier members together for simultaneous movement between said safe and said intermediate position;
(g) means for igniting said primer upon movement of said carrier members from said safe to said intermediate position;
(h) said primer having a shearing charge therein adjacent the intersection of said two carrier members to shear the primer casing after a timed delay after ignition to release said first carrier member which is then moved to said armed position by said driving means leaving said second carrier member in said intermediate position;
(i) first detonating means mounted in said second carrier member;
(j) means for initiating said first detonating means upon the occurrence of a second event with said second rotor in said intermediate position, a second event occurring with both of said carrier members in said intermediate position causing said first detonating means to deform said carrier members to dud said fuze; and
(k) said first carrier member having second detonating means mounted therein in line with said first detonating means in said armed position, said ignited primer in said first carrier member thereby exploding said munition if said second event does not occur within a timed period after said first carrier member reaches said armed position, said first and second detonating means exploding said munition if said second event occurs during said timed period.

7. A munition fuze, comprising:
(a) a housing having a chamber therein;
(b) a first rotor mounted in said chamber for rotation about an axis from a safe position through an intermediate position to an armed position;
(c) a second rotor mounted in said chamber for rotation about said axis between corresponding safe and intermediate positions;
(d) means for holding said rotors in said safe position and for releasing said rotors;
(e) driving means for rotating said first rotor from said safe to said armed position;
(f) a delay primer mounted in said rotors to lock said rotors together for simultaneous rotation between said safe and said intermediate position;
(g) means for igniting said primer upon movement of said rotors from said safe to said intermediate position;
(h) said primer having a shearing charge therein to shear the primer casing adjacent the intersection of said rotors after a timed delay after ignition to release said first rotor for rotation to said armed position by said driving means;
(i) firing pin means mounted in said chamber;
(j) an impact detonator mounted in said second rotor in line with said firing pin means in said intermediate position;
(k) means for driving said firing pin means into said impact detonator; and
(l) said first rotor having a relay charge mounted therein in line with said firing pin means and said impact detonator in said armed position, said firing pin means exploding said munition through said impact detonator and said relay charge if said ignited delay primer in said first rotor does not first explode said munition.

8. A munition fuze, comprising:
(a) a housing member having a chamber therein;
(b) a first carrier member movably mounted in said chamber;
(c) means for moving said first carrier member from a safe position through an intermediate position to an armed position;
(d) a second carrier member mounted in said chamber for movement between corresponding safe and intermediate positions;
(e) pyrotechnic delay means mounted in said first and second carrier members to lock said carrier members together for simultaneous movement between said safe and said intermediate position;
(f) means for holding said second carrier member in said safe position and for releasing said second carrier member upon the occurrence of a first event;
(g) means for igniting said delay means upon movement of said carrier members from said safe to said intermediate position;
(h) said delay means including means located adjacent the intersection of said two carrier members to release said first carrier member from said second carrier member after a timed period;
(i) first detonating means mounted in said second carrier member;
(j) means for initiating said first detonating means upon the occurrence of a second event with said second rotor in said intermediate position; and (k) said first carrier member having second detonating means mounted therein in line with said first detonating means in said armed position, said ignited delay means in said first carrier member thereby exploding said munition if said second event does not occur within a timed period after said first carrier member reaches said armed position, said first and second detonating means exploding said munition if said second event occurs during said timed period.

9. A munition fuze, comprising:
(a) a housing having a chamber therein;
(b) a first carrier member mounted in said chamber for movement from a safe position through an intermediate position to an armed position;
(c) a second carrier member mounted in said chamber adjacent said first carrier member for movement between corresponding safe and intermediate positions, said carrier members each being adapted to carry explosive elements that are spaced apart for safety in the safe position and that are positioned to perform distinct fuzing functions in the intermediate and armed positions;
(d) means for holding said carrier members in said safe position and for releasing said carrier members;
(e) means for driving said first carrier member from said safe to said armed position;
(f) a delay primer mounted in said carrier members to lock said carrier members together for simultaneous movement between said safe and said intermediate position;
(g) means for igniting said primer upon movement of said carrier members from said safe to said intermediate position; and
(h) said primer having a shearing charge therein to shear the primer casing adjacent the intersection of said carrier members after a timed delay after ignition to release said first carrier member for movement to said armed position by said driving means.

No references cited.

BENJAMIN A. BORCHELT, *Primary Examiner.*

G. H. GLANZMAN, *Assistant Examiner.*